United States Patent [19]

Lipkins

[11] 4,319,804
[45] Mar. 16, 1982

[54] ADJUSTABLE HOLLOW RETROFLECTOR

[76] Inventor: Morton S. Lipkins, 3 Nemeth St., Malverne, N.Y. 11565

[21] Appl. No.: 188,041

[22] Filed: Sep. 17, 1980

[51] Int. Cl.³ .............................................. G02B 5/122
[52] U.S. Cl. .................................... 350/102; 350/299; 350/487
[58] Field of Search ........................... 350/97, 98–109, 350/288, 302, 304, 289, 299, 486, 487; 404/14–16

[56] References Cited

U.S. PATENT DOCUMENTS

| 3,574,448 | 4/1971 | Paine | 350/102 |
|---|---|---|---|
| 3,663,084 | 5/1972 | Lipkins | 350/288 |
| 3,758,199 | 9/1973 | Thaxter | 350/487 |
| 4,065,204 | 12/1977 | Lipkins | 350/102 |

FOREIGN PATENT DOCUMENTS 652520 3/1979 U.S.S.R. ............................. 350/487

OTHER PUBLICATIONS

McElroy et al, Laser Tuners Using Circular Piezoelectric Blenders, Jun. 1975/vol. 14, No. 6, Applied Optics pp. 1219–1302.

Primary Examiner—R. A. Rosenberger

[57] ABSTRACT

The disclosed hollow retroflector has three front optically flat reflecting surfaces arranged essentially in orthogonal reference planes, each surface being on a plate having a pivotal axis perpendicular to one of the reference planes and having an adjusting device remote from its pivotal axis for fixing the plate in position that is adjustable about its respective axis. The adjusting device and the means that establishes the pivotal axis cooperate with portions of the plates that are outside the aperture of the retroflector.

16 Claims, 2 Drawing Figures

ADJUSTABLE HOLLOW RETROFLECTOR

The present invention relates to retroflectors, particularly hollow corner-cube retroflectors.

Hollow corner-cube retroflectors have been known as devices having the property of reflecting entering light rays parallel to their entering paths without requiring a critical attitude of the retroflector to the entering light. My U.S. Pat. No. 3,663,084 issued May 16, 1972 is an example of known hollow corner-cube retroflectors. Such retroflectors have three front optically flat reflecting surfaces in planes that converge toward a common corner intersection. The reflector plates of the prior art are commonly unified by bonding material precisely in mutually right-angled or orthogonal planes.

An object of the present invention resides in providing retroflectors having reflector plates which are adjustable by the user. For example, adjustability may be desired for correcting inaccuracy that may develop, such as might result from temperature-induced changes in the relative orientation of the reflector plates. The proposed adjustment may be manual. However, it may be performed electrically, which is of special advantage where remote control is a consideration.

Another object of the present invention resides in providing a novel adjustable hollow retroflector having holding devices that cooperate with the reflector plates in an effective manner enabling the plates to be adjustable angularly. More specifically, in the novel retroreflector, the reflector plate supporting means avoids imposing significant warping stresses on the reflector plates. During manufacture, the supporting means readily accommodates positioning of the reflector plates close to each other with clearance allowing for adjustments. The adjusting and supporting devices cooperate with portions of the reflector plates that extend forward and rearward to positions outside the aperture of the retroflector.

In the illustrative embodiment of retroflectors detailed below, the provided adjusting means is capable of producing fine displacements with precision. For example, a compound screw may be used of the type found in micrometers. Where a piezoelectric crystal or a stack of such crystals is used to make the adjustments electrically, large and easily measured D.C. voltages can be applied to produce minute displacements. Such adjusting devices can be calibrated or the displacements can be calculated, making the control accessible even though the adjuster of the retroflector may be inaccessible. Other forms of electromechanical transducers may be used as the adjusting devices, such as magnetostrictive actuators wherein a magnetostrictive core is adjustably magnetized by a coil, and the coil has energizing means with a control that may be remote from the retroflector.

A further object of the invention resides in providing adjustably controlled retroflectors having deflection-monitoring means, more particularly deflection-monitoring means forming part of a servo system controlling the electromechanical adjusting devices.

Pursuant to a related object, a novel electrically adjustable retroflector is provided where resolution and efficiency of the retroflector may be modulated electrically. In such apparatus, the intensity of the reflected beam can be modulated which is useful, for example, for identifying a particular retroflector that may be one among several at a remote target area.

In the preferred embodiment of the invention shown in the drawings and described in detail below, a portion of each reflector plate is supported by elements that establish a pivotal adjustment axis. The adjustment axes of the three plates are optimally perpendicular to respective orthogonal reference planes. The reflecting surfaces when in adjustment are in, or parallel to, the reference planes. An adjusting device cooperates with a portion of each reflector plate remote from its pivotal axis, forming an active support that fixes the plate in a desired angular position that is adjustable about the pivotal axis. The supporting means for each plate ideally includes two spaced-apart grippers for establishing the pivotal axis and a third gripper remote from the axis, the third gripper being adjustable for displacing the plate adjustably about the axis. The grippers are distributed at corners of a triangle and thus tend inherently not to develop significant bending stresses in the reflector plate. During assembly, the plates can be shifted readily in their own planes so that an edge of each plate can be close to the broad front surface of another of the plates without being so close as to interfere with the requisite ranges of adjustment about the pivotal axes.

In the illustrative embodiment, each gripper provides a rounded rigid part that bears against one broad surface of the reflector plate while a resilient part presses against the opposite side of the plate to hold the plate against the rigid part. In this way, the plate is resiliently biased against rounded rigid parts which establish orientation of the reflector plate without damaging the plate. The two grippers that establish the pivotal axis have their rigid parts at the same side of the reflector plate.

Retroflectors have an aperture, meaning the outline of places where rays of light enter and leave the retroreflector. The plates have portions extending outside the aperture where they are gripped. For each plate, one gripped portion is an extension behind the area where it is opposite to the edge of another plate. Another gripped portion of each plate extends forward and out of the retroflector's aperture.

The nature of the invention and its foregoing and other objects, novel features and advantages will be better appreciated from the following detailed description of an illustrative embodiment which is shown in the accompanying drawing.

IN THE DRAWINGS

Figure 1:
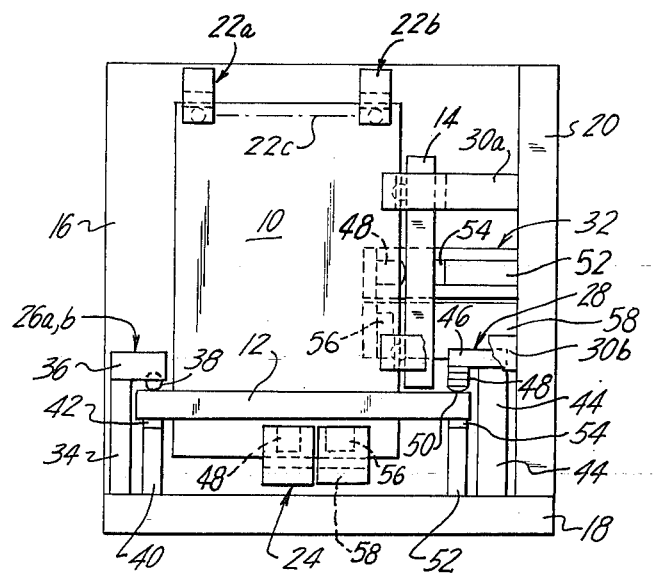
FIG. 1 is a side view of an illustrative embodiment of the invention.

In the drawings, glass plates 10, 12 and 14 are arranged in mutually right-angled planes with broad surfaces thereof arranged to form a hollow corner-cube retroreflector. The hollow corner-cube is supported in a three-walled base having walls 16, 18 and 20 rigidly fixed to each other and disposed in mutually right-angled planes so as to form a supporting hollow corner-cube. Each of the glass plates 10, 12 and 14 is supported at three locations, two of which constitute a pivotal axis and the third of which is adjustable to swing the glass plate about that axis, operating through a very small angle which represents the range of adjustment. Thus, plate 10 is supported near its upper edge by two pivotal supports 22a and 22b and plate 10 is supported at its lower end by active support 24 that is capable of swinging plate 10 about the axis 22c defined by pivotal supports 22a and 22b. Similarly, plate 12 is supported by pivotal supports 26a and 26b remote from support plate 20, and by active support 28 close to plate 20. Correspondingly, plate 14 has two supports 30a and 30b near the edge of plate 14 remote from support plate 16, and plate 14 has an active support 32 adjacent the edge of plate 14 close to support plate 16.

All of the pivotal supports are identical and will be described in detail in connection with pivotal supports 26a and 26b. Each pivotal support includes a post 34 extending from the support plate which is opposite to the broad face of the supported glass plate. An overhang 36 is rigidly fixed to post 34. A rigid sphere 38 as of steel or other rounded rigid element is captive between overhang 36 and the glass plate. At the side of the glass plate directly opposite ball 38 there is a second post 40 which bears a rubbery or elastomeric part 42 that resiliently presses the glass plate against the rigid glass-engaging element 38.

The active supports of the three plates are alike and may be described in connection with reflector plate 12. Active support 28 includes a post 44 extending rigidly from the plate 18 opposite to the broad face of the supported plate 12. Overhang 46 is rigidly fixed to post 44. A piezoelectric plate or a stack of such plates as of barium titanate or barium zirconate is confined between overhang 46 and a rigid bearing part 50 that engages the glass plate. The piezoelectric device has suitable electrical terminals and is appropriately insulated against short-circuit, and it may be rigidly unified with bearing part 50. Each bearing part 50 may have cylindrical curvature about an axis parallel to axis 26c (FIG. 2) or it may be spherical or it may be rounded otherwise to enable it to bear forcefully against the glass plate without causing damage. Opposite rounded bearing part 50 is a second post 52 that is rigidly fixed to the support plate 18. A rubbery body 54 is tightly confined in the space between post 52 and the supported glass plate. Various values of D.C. voltage may be applied to the piezoelectric device 48 by control means (not shown) so that the length of that device (measured perpendicular to the glass) can be adjusted. Elastomeric part 54 accommodates such adjustment. Part 54 presses plate 12 against rigid part 50 and causes the glass plate to swing about axis 26c that is established by parts 26a and 26b near the opposite margin of the glass plate.

Support plates 16, 18 and 20 are united and form a rigid base. These supporting plates are in orthogonal planes essentially parallel to the reflector plates. During manufacture of the retroreflector, each reflector plate may be shifted freely in the plane of its broad rear surface on its supports 42 and 54. The opposite overhangs 36 and 46 may then be secured in position as by screws and guide pins to grip the reflector plate, squeezing elements 42 and 54. In this way, each plate can be adjusted so that one of its side edges is opposite to but spaced slightly from the front reflecting surface of another one of the reflector plates. Some small separation is needed to allow for its range of pivotal adjustment.

Rubbery elements 42 and 54 are advantageously bonded to posts 40 and 54 initially. In the finished retroreflector, elements 42 and 54 are additionally bonded to the various glass plates. This is accomplished, for example, by coating the plate-engaging surfaces of elements 42 and 54 with bonding material that requires curing but which remains uncured at least until the reflector plates have been assembled with the desired clearances between them. Thereafter the bonding material may become cured with the passage of time or it may be heat-cured, depending on the type of bonding material that is used. In the final condition of the retroreflector, elements 42 and 54 secure the plates against accidentally shifting out of their assembled positions.

The grippers act as pairs of directly opposed jaws distributed at the corners of a triangle, and thus they inherently avoid imposing bending stresses on the gripped glass plate. By mounting the set of grippers 26a, 26b and 28 on a common flat support plate, the parts of the gripper can readily be made to dimensions that hold the reflector plates parallel to the respective support plates. It is therefore desirable to form the support plates so that they will be disposed in orthogonal planes within reasonable limits of manufacturing tolerance.

It is contemplated that a suitable adjusting screw (not shown) may be provided for ball 38 of one gripper of each pair of grippers (e.g. 26a and 26b) that establish the pivotal axis of each plate. Additionally, it is contemplated that a supplementary mechanical adjustment shall be provided for bodily shifting electrical adjusting device 48. The supplementary adjustment may advantageously be a compound screw device like those found in micrometers, arranged to shift device 48 without rotating that device. These mechanical adjustments facilitate establishing the desired orthogonal relationship of the reflecting surfaces with optical precision. During this factory adjustment, electrical adjusting devices 48 may be energized to a mean part of their range so that adjustments of the retroreflector can later be made electrically in opposite directions from the mean.

Figure 2:
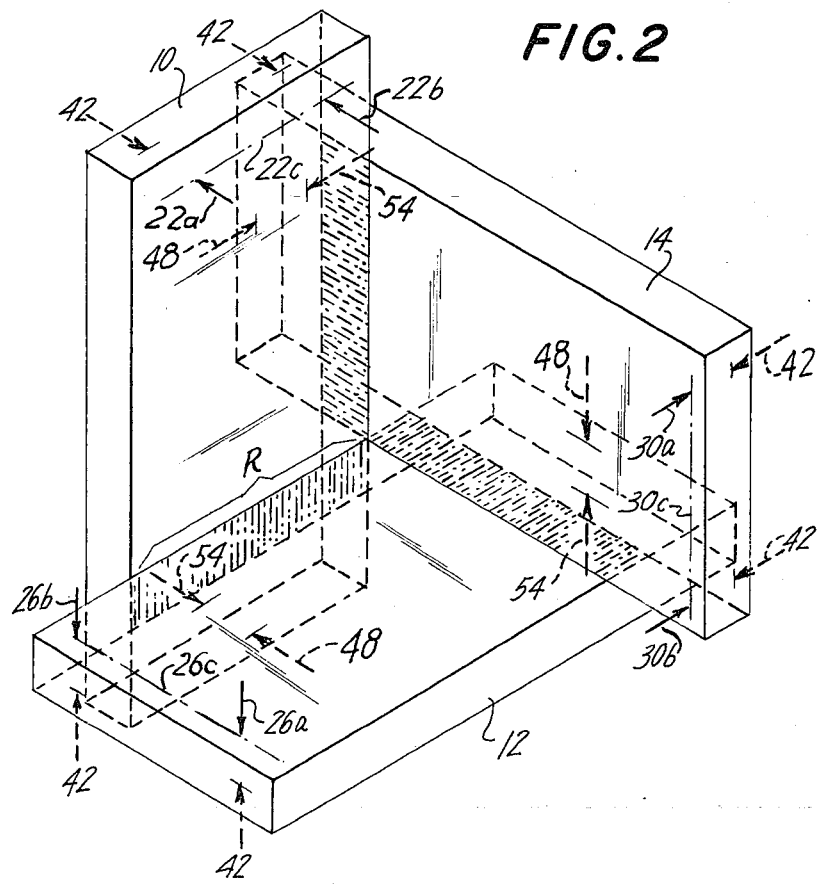
FIG. 2 is an isometric view of reflecting plates forming parts of the embodiment of FIG. 1, FIG. 2 being diagrammatic in some respects.

The aperture of the retroreflector is roughly identified with circular arcs across the reflecting surfaces of the reflector plates, having a radius R (FIG. 2) equal to the width of the exposed reflecting surfaces, all three plates here having the same width. Light entering the aperture is reflected by each of the three plates successively and exits parallel to the entering path. The pair of grippers that establish the pivotal axis of each plate and the active gripper cooperate with portions of each of those plates extending outside the aperture. As already noted, elements 38 of grippers 22a and 22b define pivotal axis 22c of plate 10, and each elastic element 42 presses the plate against a companion element 38. Grippers 22a and 22b cooperate with a portion of plate 10 that is above the upper edge of plate 14 as shown in FIG. 2. Those grippers are thus located distinctly outside the aperture. Similarly grippers 26a and 26b of plate 12 and grippers 30a and 30b of plate 14 cooperate with portions of those plates distinctly outside the aperture of the retroreflector. Adjusting elements 48 are also located outside the aperture of the retroreflector, best seen in FIG. 2. An edge portion of plate 10 is directly opposite to the front reflecting surface of plate 14. This edge portion of plate 10 is shaded for identification in FIG. 2, as are corresponding edge portions of plates 12 and 14. A portion of plate 14 extends behind the shaded edge portion of plate 10 or, briefly said, a portion of plate 14 extends behind plate 10. By like token, a portion of plate 12 extends behind plate 14, and a portion of plate 10 extends behind plate 12. Active adjusters 48/54 cooperate with those rear extensions of plates 10, 12 and 14, respectively. Grippers 48/54 are thus distinctly outside the aperture of the retroreflector.

In its simplest form, each adjusting device may be a fine-pitch screw or a compound screw of the kind having differential threads, as in micrometers. As indicated above, the adjuster may be an electromechanical transducer; and it may be appropriate to use a piezoelectric adjusting device carried by a compound screw. It is not unusual for piezoelectric devices to be carried by manual screw-threaded adjustment devices.

The piezo-electric device 48 in FIG. 1 is an especially effective kind of adjustment device for the present retroreflector. It can be calibrated, it responds to applied voltage variably as a direct function of the voltage, it draws only nominal energy and therefore develops only minimal self-heating. The voltage control can be located at a distance from the adjusting device 48 so that the control can be readily accessible even if the retroreflector happens to be at a remote or otherwise inaccessible location.

Especially in the case of a retroreflector having a particularly large aperture, it may be unsatisfactory to rely on the stability of the parts of a hollow retroreflector as manufactured, adjusted and unified. The described adjustable form of retroreflector is amenable to fine adjustment from time to time as may be required by random factors. With but one active adjustor for each reflector plate, it is feasible to make adjustments of all three reflecting surfaces into precise orthogonal planes. In this adjustment, the beam of an autocollimator may be directed into the aperture of the retroreflector and the adjusting devices may then be operated for developing coincidence of the images of the autocollimator's reticle.

It may be important to the user to know how far he has moved the reflecting plate during an adjustment. Toward that end, the adjusting device may be calibrated. In the case of a micrometer-type adjustment, the readings are always available. Piezoelectric and other electromechanical transducers can be calibrated, so that the extent of adjustment can be determined from the applied values of voltage at the start and end of the adjustment operation. As a further feature, a measuring device appropriate to the small distances here involved can be adopted, for example a laser interferometer. Measurement device 56 may be mounted adjacent adjuster 48 on the same or a separate post 58. Noting the fact that the reflecting surface of each reflector plate is normally aluminized and that the rear-projecting portions of the reflector plates are ordinarily reflecting, a laser interferometer can be mounted as shown, to provide highly accurate measurements of displacement of each reflector plate. The measurement utilizes a portion of each plate that is outside the aperture of the retroreflector. Indeed, the output of the measurement device 56 can be used as part of a servo system for maintaining constant any condition of adjustment that is manually established.

The external control for the adjusting device may be cyclically variable, as with an alternating voltage applied to an electromchanical adjuster. When this is done, the operation of the adjuster causes the beam reflected by the retroreflector to be modulated. In this way, a particular retroreflector among several at a given location can be identified even when they are at a distant location.

The illustrative retroreflector shown in the drawings and described in detail above is of course subject to being modified by those of ordinary skill in the art. For example gripper 48/54 and the other grippers that establish the pivotal axis of a plate could be reversed, if desired, so that the adjusting device and the other grippers would be interchanged. Also, while the grippers are arranged with their hard bearing parts at the reflecting surfaces of the plates, that arrangement can be reversed, the rigid parts then acting on the rear surfaces of the plates. The grippers are shown as being distributed at the corners of an isosceles triangle, an arrangement that avoids self-generated warping stresses that might arise due to the weight of cantilever portions of the reflector plates. However adjustable grippers located at two corners of a right triangle and a fixed gripper located at the right-angle corner is a contemplated modification. It is advantageous in simplifying the initial factory adjustment of the retroreflector. These and other modifications may be readily introduced into the illustrative embodiment shown and described. Therefore the invention should be construed broadly in accordance with its full spirit and scope.

I claim:

1. An adjustable retroreflector, including three adjustable plates having broad opposite surfaces, each of said plates fixedly bearing an optically flat front reflecting surface, said plates and said reflecting surfaces borne thereby being disposed to form a hollow reflecting corner-cube, a rigid supporting base, means carried by said base for securing said plates to said base, said securing means including, for each plate, means cooperating with opposite broad surfaces of first portions of the related one of said plates for establishing a pivotal axis therefor, the axis of each plate being parallel to or on the reflecting surface thereof and being essentially perpendicular to a respective one of three orthogonal reference planes, and said securing means including adjustable means cooperating with the opposite broad surfaces of a respective portion of each of said plates remote from said first portions thereof for securing said plates firmly in positions that are adjustable about said axes.

2. An adjustable retroreflector as in claim 1, wherein said base includes three support plates fixed rigidly together in planes essentially parallel to said adjustable plates, respectively, and wherein each said means cooperating with opposite broad surfaces of each said adjustable plate includes a pair of localized jaws gripping opposite portions of said opposite broad surfaces, the jaws gripping each said adjustable plate extending from a respective support plate of the base that is essentially parallel to the adjustable plate gripped thereby.

3. An adjustable retroreflector as in claim 1, wherein said means cooperating with each said adjustable plate consist of three localized grippers distributed at the corners of a triangle, each said gripper having parts acting essentially opposite each other.

4. An adjustable retroreflector as in claim 3 wherein each said gripper includes an elastomeric element bonded to a respective one of said plates for maintaining said plates in assembly to said base.

5. An adjustable retroreflector as in claim 4 wherein each said plate and the reflecting surface borne thereby are edgewise opposite to and separated slightly from the reflecting surface borne by another of said adjustable plates.

6. An adjustable retroreflector as in claim 3 wherein each said plate and the reflecting surface borne thereby has an edge opposite to and separated slightly from the reflecting surface borne by another of said adjustable plates.

7. An adjustable retroreflector as in claim 3, wherein two of said three grippers of each adjustable plate establish said pivotal axis and have rigid rounded elements at one broad surface of the adjustable plate and resilient elements at the opposite broad surface of the adjustable plate acting to bias the plate against said rigid elements.

8. An adjustable retroreflector as in claim 1, wherein said means establishing a pivotal axis for each said reflector plate and said adjustable means comprise resilient elements secured to said supporting base and to said reflector plate for securing said reflector plate against unintended displacement from said base.

9. An adjustable retroreflector as in claim 1, wherein said adjustable securing means for the portions of each said adjustable plate remote from the pivotal axis thereof comprises an electromechanical transducer.

10. An adjustable retroreflector as in claim 6 wherein said transducer is a piezoelectric actuator.

11. A hollow corner-cube retroreflector, comprising three adjustable plates bearing broad optically flat front reflecting surfaces, said plates and the reflecting surfaces borne thereby being disposed to form a hollow reflecting corner-cube, the planes of said reflecting surfaces converging toward a corner intersection, a main portion of each said adjustable plate having an edge portion opposite to but having limited spacing from a second of said adjustable plates and the reflecting surface borne thereby, each said main portion of each said adjustable plate being a first projecting portion extending forward from said corner intersection and each said adjustable plate having a second projecting portion extending generally behind said hollow corner-cube, a unitary supporting base, and means for securing said plates to said base adjustably, said securing means comprising, for each said plate, first means carried by said base for providing a said projecting portion of each said plate with a pivotal axis, the axis of each plate being parallel to or on the reflecting surface thereof and being essentially perpendicular to a respective one of three orthogonal reference planes, and said securing means additionally including, for each said plate, adjustable means carried by said base and cooperable with the other said projecting portion of each said plate for fixing each said plate in a secure position that is adjustable about the related pivotal axis.

12. A hollow retroreflector as in claim 11, wherein said first means comprises two spaced-apart grippers and wherein said adjustable means comprises a third gripper, each of said grippers cooperating with opposite broad surfaces of said adjustable plate, said grippers being distributed at the corners of an imaginary triangle.

13. A hollow retroreflector as in claim 12, wherein said adjustable means comprises three electrical actuators variably responsive to electrical excitation, and including means for electrically exciting said actuators individually and adjustably to control the adjustment of each said adjustable plate about its related axis.

14. An adjustable retroreflector, including three adjustable plates each fixedly bearing an optically flat front reflecting surface, said adjustable plates and said reflecting surfaces borne thereon being disposed to form a hollow reflecting corner-cube, a rigid supporting base, and adjustable means for securing said plates to said base, said adjustable securing means including, for each said plate, a pair of localized pivots carried by said base, each said pair of pivots being disposed for establishing a pivotal axis for one of said plates on or parallel to the reflecting surface thereof, each axis being essentially perpendicular to a respective one of three orthogonal reference planes, respectively, each of said three plates having a localized adjustment device bearing against its plate at a position displaced from the pivotal axis thereof, and resilient biasing and securing elements acting on said plates locally in alignment with said pivots and said adjustment devices for biasing said plates against said pivots and for maintaining said plates and the reflecting surfaces borne thereby in assembly to each other and to said supporting base.

15. An adjustable retroreflector as in any of claims 1–14 wherein the reflecting surface borne by each said plate is formed thereon.

16. An adjustable retroreflector as in any of claims 1, 8 and 14 wherein said securing means comprise, for each said plate, three elements of hard material arranged in a triangle, each having a convex surface engaging a broad surface of a respective plate.

* * * * *